Feb. 6, 1923.
P. McLAUGHLIN.
BICYCLE DRIVING MECHANISM.
FILED JULY 18, 1921.
1,443,997
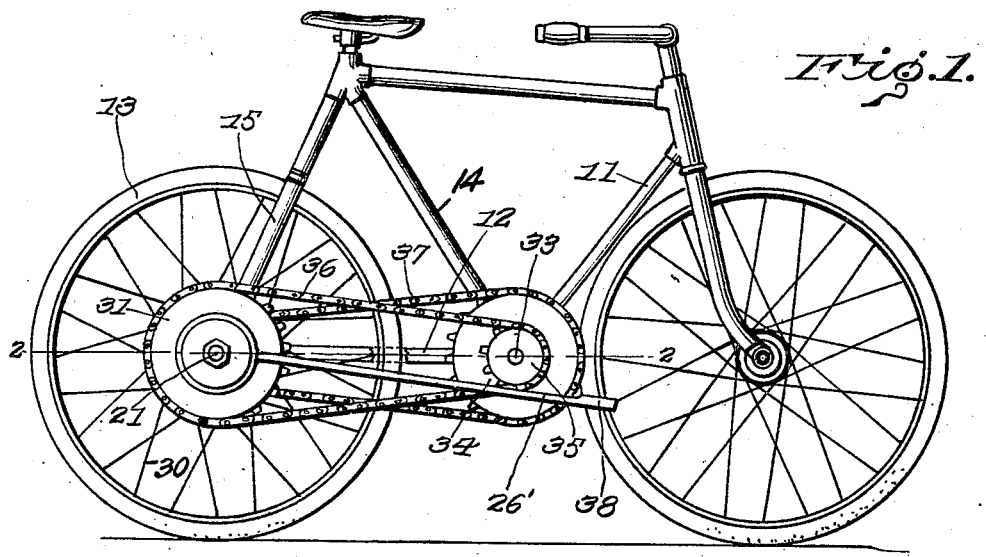
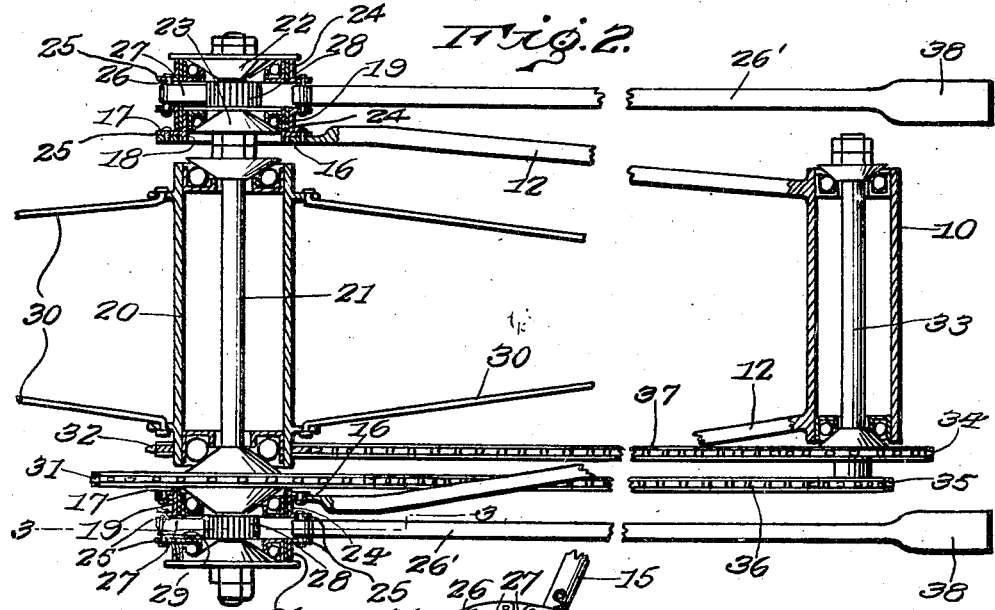
Inventor
Patrick McLaughlin
by
Chandler & Chandler
Attorneys.

Patented Feb. 6, 1923.

1,443,997

UNITED STATES PATENT OFFICE.

PATRICK McLAUGHLIN, OF DOVER, NEW HAMPSHIRE, ASSIGNOR OF ONE-HALF TO ARTHUR R. WATSON, OF DOVER, NEW HAMPSHIRE.

BICYCLE DRIVING MECHANISM.

Application filed July 18, 1921. Serial No. 485,726.

*To all whom it may concern:*

Be it known that I, PATRICK MCLAUGHLIN, a citizen of the United States, residing at Dover, in the county of Stratford, State of New Hampshire, have invented certain new and useful Improvements in Bicycle Driving Mechanisms; and I do hereby declare the following to be a full, clear, and exact description of the invention, such as will enable others skilled in the art to which it appertains to make and use the same.

This invention relates to new and useful improvements in bicycles and particularly to driving gears therefor.

One object of the invention is to provide a gearing operable by lever and ratchet mechanism is simple in construction, easy to operate, and in which the gearing is greatly multiplied.

Another object is to provide a particular and specific structure of lever and ratchet mechanism which is simple in construction, and which may be easily applied to the ordinary bicycle frame.

Other objects and advantages will be apparent from the following description when taken in connection with the accompanying drawing.

In the drawing:

Figure 1 is a side elevation of a bicycle equipped with the improved driving mechanism.

Figure 2 is an enlarged horizontal longitudinal sectional view through the axles of the mechanism, on the line 2—2 of Figure 1.

Figure 3 is a vertical longitudinal sectional view on the line 3—3 of Figure 2, to show the pawls and ratchet mechanism.

Referring particularly to the accompanying drawing, there is shown a bicycle frame which includes the crank hanger, at 10, the upwardly and forwardly inclined bar 11, the horizontal and rearwardly extending parallel bars 12, which straddle the rear wheel 13, and the upwardly converging bars 14 and 15, extending respectively from the crank hanger 10 and the rear ends of the parallel bars 12. Formed at the juncture of the bars 12 and 15, and at opposite sides of the bicycle frame, are the flat rings 16 to which are bolted or riveted the flanges 17 of the collars 18. Within each of these collars 18 are disposed bearing ball retainers 19. The hub of the rear wheel is shown at 20, and disposed through the hub, and through the collars 18, is the axle 21, cones 22 and 23 being mounted thereon, for engagement with the balls of the retainers 19. Snugly fitted on each collar 18, for rotation thereon, are the collars or sleeves 24. The inner end of each of the sleeves 24 is formed with a peripheral flange 25, and disposed between these flanges and riveted thereto is the inner end of a pedal lever 26'. Disposed between the flanges 25, and pivotally supported on the transverse pins 26, are the pawls 27, the same engaging with the teeth of the ratchet wheel 28, which secured on the axle 21. Openings 29 are formed in the collars 18 for the projection therethrough of the pawls 27, to permit them to engage the teeth of the ratchet wheels. The spokes 30 of the wheel 13 are secured to the hub 20.

Secured on one end of the axle, inwardly of the frame bars 12 and 15, is a large sprocket wheel 31, and secured on the adjacent end of the hub 20 is a smaller sprocket wheel 32.

In the crank hanger 10 is rotatably supported the transverse shaft 33, and on one end of this shaft are fixed the large sprocket wheel 34 and the smaller sprocket wheel 35, the latter being arranged outwardly of the former. A drive chain 36 is engaged around the sprocket wheels 31 and 35, while a drive chain 37 is engaged around the sprocket wheels 32 and 34. By this arrangement the sprocket 31 drives forwardly to the sprocket 35, and the sprocket 34 drives backwardly to the sprocket 32, causing the hub 20 and the rear wheel 13 to turn.

The levers 26' extend forwardly to points adjacent the ends of the crank hanger 10 where they are provided with tread members 38 for the feet of the operator.

Connected to the flanges 25 and to the frame bars 15 are the springs 39 which serve to lift the pedal levers 26' into elevated position and maintain the same in such position until depressed by the feet of the rider of the bicycle.

It will thus be seen that as the rider depresses the pedal levers 26' the collar or sleeve sections will be rotated causing the pawls to engage with the ratchet wheels 28 and rotate the rear axle 21. The motion of the axle 21 is transmitted, by means of the chain 36 to the shaft 33, and this motion is transferred back to the hub 20 by means of the chain 37, with the result that the rear wheel will be rotated and the bicycle driven forwardly. As the rider depresses one pedal lever he lifts his foot upwardly at the other side of the bicycle, the pedal rising through the influence of the spring 39.

It will also be noted that the construction hereinbefore described readily permits the rider to coast, upon holding the pedal levers from movement.

What is claimed is:

1. A bicycle driving gear including a rear axle and hub mounted for independent rotation, spaced collars secured to the frame of the bicycle at each end of the hub, a rotatable sleeve on each collar, said sleeve being formed in two mutually adjacent flanged sections, a pedal lever pivotally supported between the flanges of the sleeve sections, ratchet wheels on the ends of the axle, a transverse shaft forwardly of the axle, driving connections between the axle and the transverse shaft, and driving connections between the shaft and the hub, and pawls pivotally supported between the flanges of the sleeve sections and engaging the ratchet wheels through the slots of the collars.

2. A bicycle driving gear including a rear axle, a hub mounted for rotation on the axle, a ratchet wheel on the axle, a sectional collar on the axle, a ring encircling the axle between the collar sections and being secured to said sections, a lever carried by the ring, and pawls carried by the ring engaging with the ratchet wheel.

In testimony whereof, I affix my signature, in the presence of two witnesses.

PATRICK McLAUGHLIN.

Witnesses:
ALBERT P. SHERRY,
LILLIAN B. WRIGHT.